(12) United States Patent
Zarate

(10) Patent No.: US 11,825,781 B2
(45) Date of Patent: Nov. 28, 2023

(54) PLANT WATERING POT

(71) Applicant: Luis Zarate, Kailua-Kona, HI (US)

(72) Inventor: Luis Zarate, Kailua-Kona, HI (US)

( * ) Notice: Subject to any disclaimer, the term of this patent is extended or adjusted under 35 U.S.C. 154(b) by 0 days.

(21) Appl. No.: 17/729,235

(22) Filed: Apr. 26, 2022

(65) Prior Publication Data

US 2022/0377992 A1    Dec. 1, 2022

Related U.S. Application Data

(60) Provisional application No. 63/193,131, filed on May 26, 2021.

(51) Int. Cl.
*A01G 27/00* (2006.01)

(52) U.S. Cl.
CPC ......... *A01G 27/003* (2013.01); *A01G 27/005* (2013.01); *A01G 27/008* (2013.01)

(58) Field of Classification Search
CPC .. A01G 27/003; A01G 27/005; A01G 27/008; A01G 9/02; A01G 9/028
See application file for complete search history.

(56) References Cited

U.S. PATENT DOCUMENTS

| | | | | |
|---|---|---|---|---|
| 3,192,665 A * | 7/1965 | Cloud | ..................... | A01G 27/06 D11/153 |
| 3,753,315 A * | 8/1973 | Adam | ..................... | A01G 27/06 47/79 |
| 3,758,987 A * | 9/1973 | Crane, Jr. | ............... | A01G 27/06 D11/143 |
| 3,775,904 A * | 12/1973 | Peters | ..................... | A01G 27/06 215/12.1 |
| 3,783,555 A * | 1/1974 | Peters | ..................... | A01G 27/06 47/79 |
| 3,903,644 A * | 9/1975 | Swift | ..................... | A01G 27/02 47/79 |
| 4,001,967 A * | 1/1977 | Swift | ..................... | A01G 27/02 47/80 |
| 4,040,207 A * | 8/1977 | Lancaster | ............ | A01G 27/008 47/80 |
| 4,083,147 A * | 4/1978 | Garrick | ................ | A01G 27/003 137/397 |
| 4,329,815 A * | 5/1982 | Secrest | .................. | A01G 27/02 47/80 |
| 4,557,071 A * | 12/1985 | Fah | ....................... | A01G 27/003 47/62 R |
| 4,745,707 A * | 5/1988 | Newby | .................. | A01G 27/00 47/32.7 |

(Continued)

*Primary Examiner* — Monica L Perry
*Assistant Examiner* — Aaron M Rodziwicz
(74) *Attorney, Agent, or Firm* — Boudwin Intellectual Property Law, LLC; Daniel Boudwin

(57) ABSTRACT

A plant water pot that automatically provides regular water to a plant and indicates a reduced water level. The plant water pot includes an inner wall that terminates at a lower end of a platform defining a receptacle in communication with an upper opening of the container. An interior volume is defined between the inner wall and the outer wall, while the interior volume retains a fluid. Nozzles are disposed about the inner wall and the nozzles are in fluid communication with the interior volume. A pump is disposed within an interior volume and is operably connected to each of the nozzles. An inlet is disposed through the upper wall and the inlet provides access to the interior volume.

16 Claims, 5 Drawing Sheets

(56) References Cited

U.S. PATENT DOCUMENTS

| | | | | |
|---|---|---|---|---|
| 4,756,121 A * | 7/1988 | Wild | A01G 27/02 | 47/80 |
| 4,819,375 A * | 4/1989 | Baumgartner | A01G 27/06 | 137/78.3 |
| 4,858,381 A * | 8/1989 | Walton | A01G 27/04 | 47/79 |
| 4,885,870 A * | 12/1989 | Fong | A01G 27/06 | 47/79 |
| 4,916,858 A * | 4/1990 | Hobson | A01G 27/04 | 47/81 |
| 4,937,972 A * | 7/1990 | Freitus | A01G 27/003 | 47/79 |
| 4,961,285 A * | 10/1990 | Jenkins | A01G 27/003 | 47/79 |
| 4,991,346 A * | 2/1991 | Costa, Jr. | A01G 27/04 | 47/79 |
| 5,020,261 A * | 6/1991 | Lishman | A01G 27/003 | 47/79 |
| 5,020,275 A * | 6/1991 | Bednarzik | A01G 27/003 | 47/79 |
| 5,044,119 A * | 9/1991 | Hougard | A47G 7/08 | 47/75 |
| 5,046,282 A * | 9/1991 | Whitaker | A01G 27/003 | 47/79 |
| 5,502,924 A * | 4/1996 | Lee | A01G 27/02 | 47/79 |
| 5,749,170 A * | 5/1998 | Furuta | A01G 27/003 | 47/79 |
| 5,860,249 A * | 1/1999 | Holtkamp, Jr. | A01G 27/06 | 47/79 |
| 6,134,833 A * | 10/2000 | Bachman | A01G 27/02 | 47/79 |
| 7,171,783 B1 * | 2/2007 | Fidotti | A01G 27/04 | 47/81 |
| 2006/0150486 A1 * | 7/2006 | Andu | A01G 27/003 | 47/48.5 |
| 2007/0084109 A1 * | 4/2007 | Brister | A01G 27/003 | 47/48.5 |
| 2007/0271842 A1 * | 11/2007 | Bissonnette | A01G 27/003 | 47/62 N |
| 2009/0293354 A1 * | 12/2009 | Goldberg | A01G 27/02 | 200/341 |
| 2011/0144812 A1 * | 6/2011 | Davis | G01F 23/24 | 700/281 |
| 2014/0130412 A1 * | 5/2014 | Ormazabal Ochoa De ChinChetru | A01G 27/008 | 47/79 |
| 2015/0096228 A1 * | 4/2015 | Watson | A01G 27/008 | 47/79 |
| 2016/0273755 A1 * | 9/2016 | Lin | A01G 9/249 | |
| 2016/0366843 A1 * | 12/2016 | Evans | A01G 27/003 | |
| 2017/0000049 A1 * | 1/2017 | Cox | A01G 27/003 | |
| 2018/0007848 A1 * | 1/2018 | Hohmann | A01G 27/02 | |
| 2018/0228100 A1 * | 8/2018 | Gergek | A01G 27/06 | |
| 2018/0368340 A1 * | 12/2018 | Ielo | A01G 27/001 | |
| 2019/0075740 A1 * | 3/2019 | Cox | A01G 27/001 | |
| 2019/0387696 A1 * | 12/2019 | Mikulecky | A01G 27/005 | |
| 2020/0236864 A1 * | 7/2020 | Henry | A01G 27/003 | |
| 2020/0344965 A1 * | 11/2020 | Song | H05B 47/16 | |
| 2021/0161087 A1 * | 6/2021 | Lee | A01G 9/025 | |
| 2021/0173369 A1 * | 6/2021 | Lung | A01G 27/003 | |
| 2021/0247081 A1 * | 8/2021 | Mittelmark | F24F 8/125 | |
| 2021/0289724 A1 * | 9/2021 | Chavez | A01G 27/008 | |
| 2022/0000050 A1 * | 1/2022 | Hsu | A01G 27/003 | |
| 2022/0095558 A1 * | 3/2022 | Allen | A01G 27/02 | |

* cited by examiner

PLANT WATERING POT

CROSS REFERENCE TO RELATED APPLICATIONS

This application claims the benefit of U.S. Provisional Application No. 63/193,131 filed on May 26, 2021. The above identified patent application is herein incorporated by reference in its entirety to provide continuity of disclosure.

BACKGROUND OF THE INVENTION

The present invention relates to plant pots. More particularly, the present invention pertains to a plant pot having a plurality of nozzles and an internal water supply configured to selectively water a plant within the pot following a pre-defined watering schedule.

Many individuals keep plants indoors, whether for ambience in their home, or in order to protect the plants from inclement weather that would otherwise damage them outdoors. In order to maintain and ensure proper plant growth, regular watering must be performed to keep the plants properly hydrated and healthy. Failing to provide sufficient and regular watering can result in inhibited plant growth, undesirable or unattractive wilting, or even plant death. However, manually watering several plants throughout a home can be time consuming, frustrating, and can often lead to one or more plants being missed. Additionally, individuals may leave their home for extended periods, such as for vacations or holidays, and therefore be unavailable to water the plant as needed. Alternatively, gravity feed watering bulbs are often used to provide a regular supply of water, however, such bulbs may not suit a user's aesthetic preferences, and fail to provide consistent and regular watering at a desired time, instead relying on soil moisture and gravity to gradually replenish water within the soil. As such watering bulbs provide extremely localized watering, a user may be required to use multiple watering bulbs for large volume plant pots to ensure that the plant's root system is properly hydrated. Furthermore, determining when additional water must be added to the watering bulbs can be difficult and adds another mental task to keep track of that can easily be forgotten. Therefore, a device that automatically provides regular water to a plant and can alert the user of reduced water levels is desired.

In light of the devices disclosed in the known art, it is submitted that the present invention substantially diverges in design elements from the known art and consequently it is clear that there is a need in the art for an improvement to existing plant pots. In this regard, the instant invention substantially fulfills these needs.

SUMMARY OF THE INVENTION

In view of the foregoing disadvantages inherent in the known types of plant pots now present in the known art, the present invention provides a plant pot with an integral water reservoir wherein the same can be utilized for providing convenience for the user when automatically watering a plant within a pot following a pre-defined watering schedule.

The present system comprises a container having a base, an outer wall extending from a perimeter of the base, and an inner wall affixed to the outer wall via an upper wall, wherein the inner wall terminates at a lower end thereof in a platform defining a receptacle in communication with an upper opening of the container. An interior volume is defined between the inner wall and the outer wall, wherein the interior volume is configured to retain a fluid therein. A plurality of nozzles are disposed about the inner wall, wherein the plurality of nozzles are in fluid communication with the interior volume. A pump is disposed within the interior volume, wherein the pump is operably connected to each of the plurality of nozzles, such that when the pump is actuated, fluid disposed within the interior volume is dispensed through at least one of the plurality of nozzles into the receptacle. An inlet is disposed through the upper wall, wherein the inlet provides access to the interior volume. A control panel is disposed on the upper wall, wherein the control panel is operably connected to a processor configured to execute a programmed schedule to selectively actuate the pump for a set duration at a desired time. In some embodiments, the control panel is in wireless communication with a remote device, wherein the programmed schedule is adjustable via inputs transmitted from the remote device.

In some embodiments, the upper end of the inner wall is disposed at a greater height than an upper end of the outer wall, such that the upper wall is disposed at an angle relative to the base of the container. In another embodiment, the plurality of nozzles are disposed equiangularly about the inner wall. In other embodiments, a feed hose extends from the pump towards the base of the container. In yet another embodiment, the plurality of nozzles are operably connected to a pipe extending from the pump, wherein the pipe extends about a circumference of the interior volume. In some embodiments, a water level sensor is disposed within the interior volume, wherein the water level sensor is configured to detect and display a current level of fluid disposed within the interior volume on the control panel and the remote device. In another embodiment, a warning is generated and displayed on the control panel and the remote device when the current level of fluid falls below a threshold level. In other embodiments, a door is hingedly affixed to the upper wall, wherein the door is selectively movable between an open position and a closed position, wherein the closed position the door overlies the inlet. In yet another embodiment, the door includes a protrusion configured to extend along the outer wall of the container when the door is in the closed position. In some embodiments, the door is disposed within a recess defined within the exterior of the container, such that an exterior surface of the door rests flush with the exterior of the container when the door is in the closed position.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
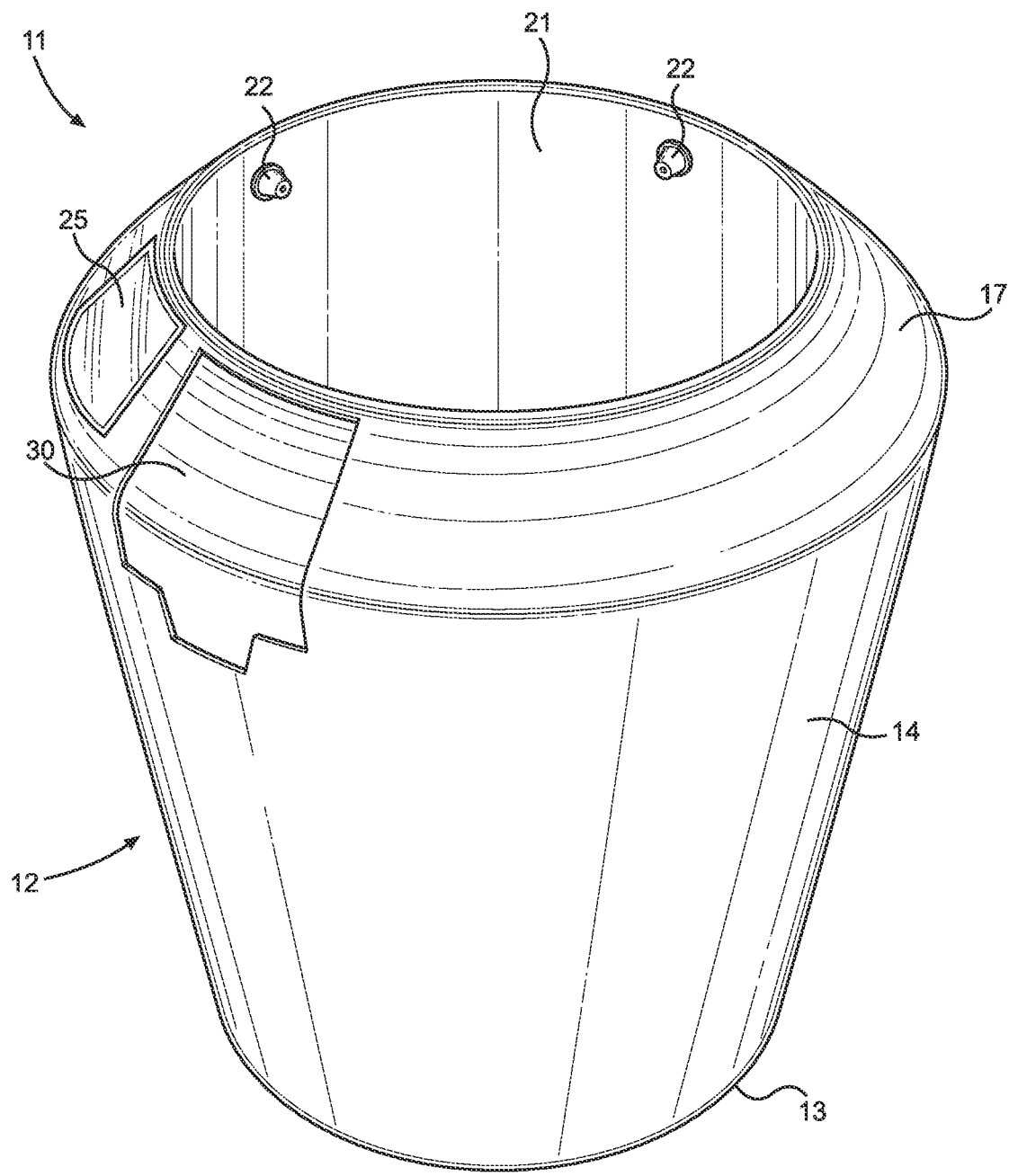
FIG. 1 shows a perspective view of an embodiment of the plant watering pot.

Reference is made herein to the attached drawings. Like reference numerals are used throughout the drawings to depict like or similar elements of the plant watering pot. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

As referred to herein, the term "electronic device" refers to any computing device that includes at least a display screen and an input mechanism. The computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such computing devices can also combine custom hard-wired logic, ASICs, or FPGAs with custom programming to accomplish the technique and other features of the present disclosure. The computing devices can be desktop computer systems, laptops, cell phones, tablets, networking devices, or any other device that incorporates hard-wired and/or program logic to implement the techniques and other features of the present disclosure.

Figure 2:
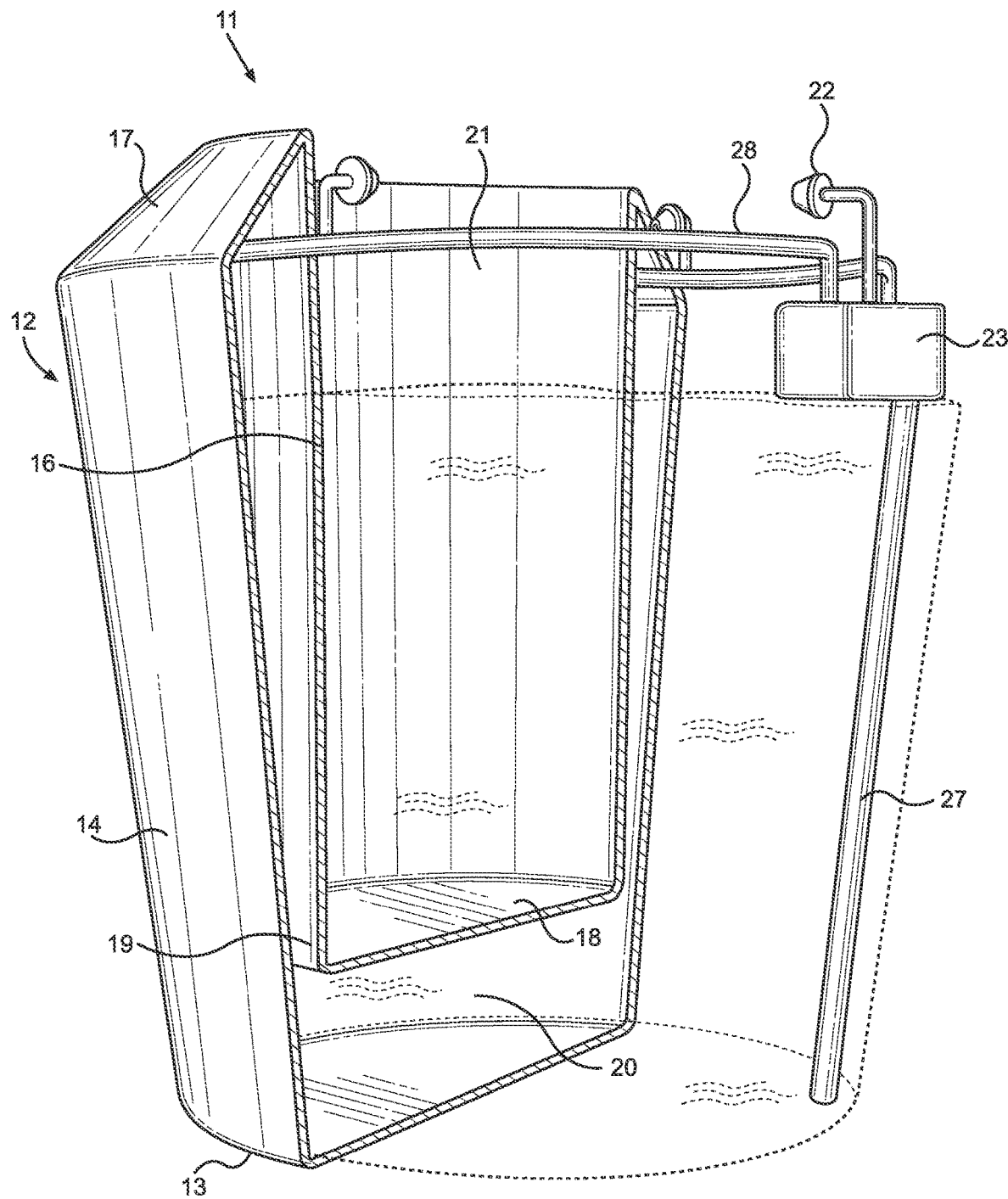
FIG. 2 shows a cutaway view of an embodiment of the plant watering pot.
Figure 3:
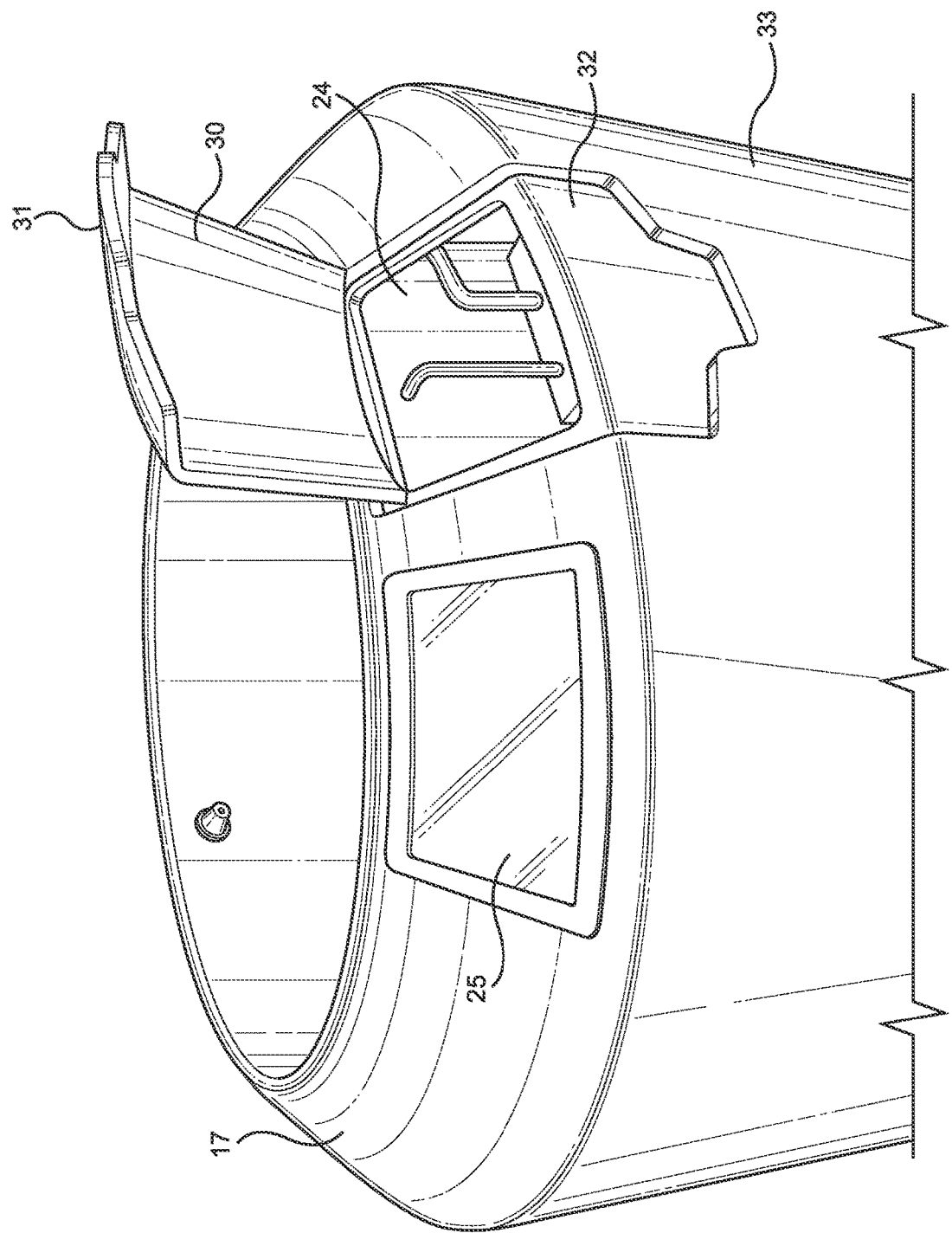
FIG. 3 shows a close-up view of the door and control panel of an embodiment of the plant watering pot.

Referring now to FIG. 1, there is shown a perspective view of an embodiment of the plant watering pot. The plant watering pot 11 comprises a double-walled container 12 having a base 13 and an outer wall 14 extending from a perimeter of the base 13, wherein the double-walled container 12 comprises an interior volume (as shown in FIG. 2, 20) between the outer wall 14 and an inner wall (as shown in FIG. 2, 16), wherein the interior volume is configured to retain a fluid therein. The double walled container 12 further comprises a receptacle 21 defined through an open upper end of the container 12, wherein the receptacle 21 is dimensioned to receive a plant therein. In the illustrated embodiment, an upper wall 17 extends between an upper end of each of the outer wall 14 and the inner wall, enclosing the interior volume. In the illustrated embodiment, the open upper end of the container 12 is disposed at a height greater than that of an upper end of the outer wall 14, such that the upper wall 17 is disposed at an acute angle relative to the base 13 of the container 12. In this manner, a control panel 25 disposed on the upper wall 17 of the illustrated embodiment is disposed at an angle to provide a comfortable and visible control system for the plant watering pot 11. The control panel 25 is contemplated to selectively control the plant watering pot 11 to allow water to be dispensed from the interior volume into the receptacle 21 as further described elsewhere herein. Furthermore, the control panel 25 comprises a display capable of providing the user with controls and feedback regarding the operating state of the plant watering pot 11, allowing the user to determine whether additional water must be added to the interior volume or select a desired pre-programmed watering schedule to implement. In the illustrated embodiment, a door 30 is hingedly affixed to the upper wall 17, wherein the door 30 overlies an inlet (as shown in FIG. 3, 24) which provides access to the interior volume to facilitate refilling the interior volume when the water level is below a desired operating threshold.

Figure 4:
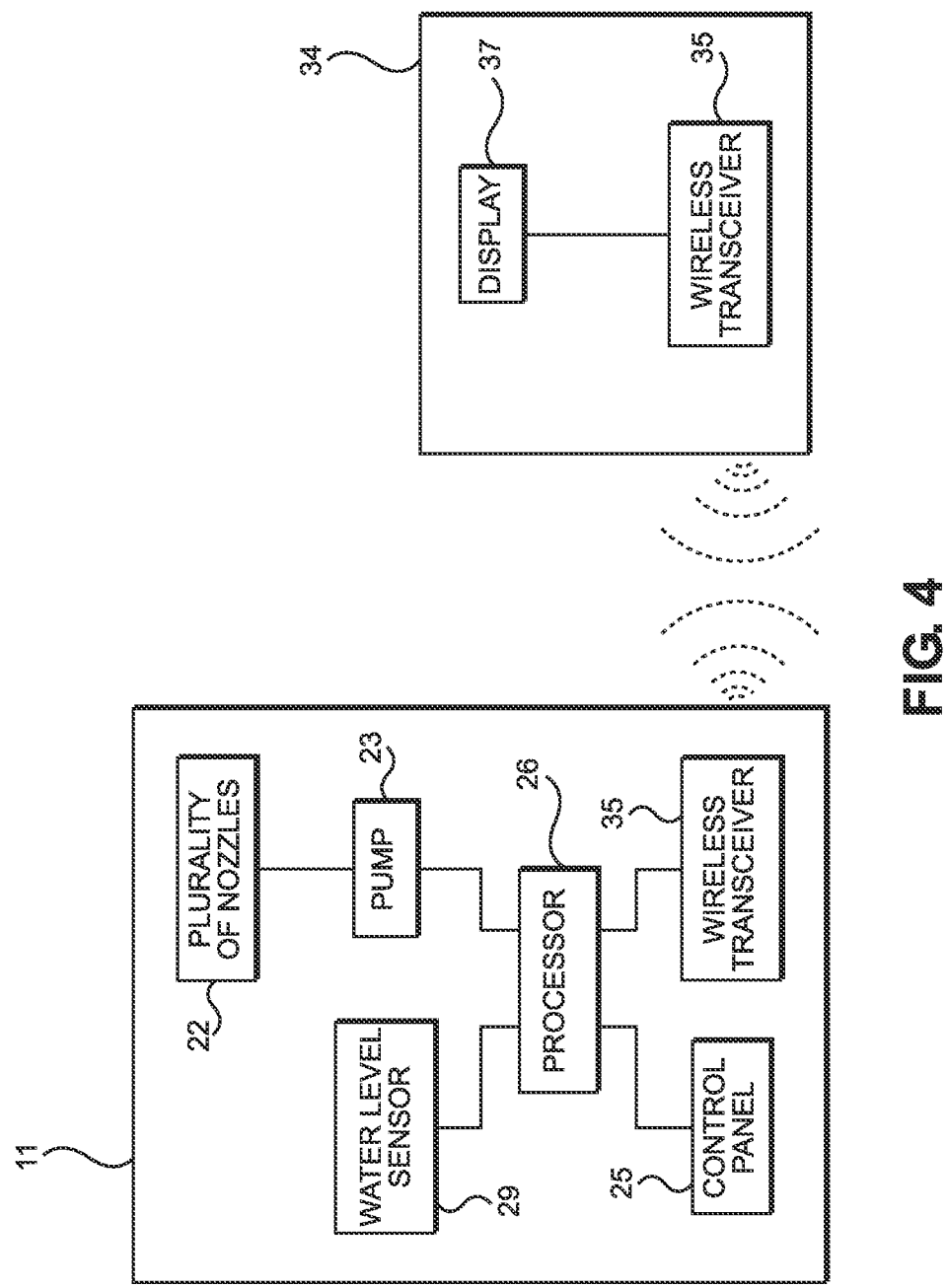
FIG. 4 shows a schematic view of an embodiment of the plant watering pot.

A plurality of nozzles 22 are disposed about an interior surface of the inner wall, wherein the plurality of nozzles 22 are in fluid communication with the interior volume, such that water disposed therein is dispensed into the receptacle 21 to water a plant as desired. In operation, the plurality of nozzles 22 are actuated upon receipt of an actuation signal generated by a processor (as shown in FIG. 4, 26), or an input from the control panel 25 disposed on the container 12, whereupon actuation, water disposed within the interior volume is dispensed from the plurality of nozzles 22 to water a plant within the receptacle 21. In some embodiments, the actuation signal is generated in association with a pre-programmed watering schedule, such that the plurality of nozzles 22 are actuated at a specified time and for a specified length of time to deliver a desired volume of water to the plant within the receptacle 21. In the illustrated embodiment, the plurality of nozzles 22 are disposed equiangularly about a circumference of the receptacle 21. In this manner, the water dispensed via the plurality of nozzles 22 is evenly distributed across the entirety of the receptacle 21.

Referring now to FIG. 2, there is shown a cutaway view of an embodiment of the plant watering pot. The receptacle 21 is defined by the inner wall 16 extending from the open upper end of the container 12 towards the base 13 of the container 12, wherein the inner wall 16 terminates in a platform 18 extending from a distal end 19 of the inner wall 16. In the illustrated embodiment, the platform 18 is disposed along a plane parallel to the base 13, wherein the platform 18 provides a resting surface for a plant disposed within the receptacle 21. In this manner, the interior volume 20 is defined between the base 13, the outer wall 14, the inner wall 16, the upper wall 17, and the platform 18, such that the entirety of the interior volume 20 comprises a reservoir for retaining fluid therein. In the shown embodiment, a lower portion of the interior volume 20 comprises is disposed between the platform 18 and the base 13, wherein an upper portion of the interior volume 20 comprises a substantially annular form factor about the inner wall 16. In this manner, the volume of fluid is maximized within the container 12 while lowering the center of gravity of the container 12 towards the base 13, reducing the risk of tipping during use.

A pump 23 is disposed within the interior volume 20 and is in fluid communication with the fluid therein, such that when actuated, the pump 23 draws fluid from the interior volume 20 and drives the fluid to the plurality of nozzles 22 via a piping system 28. In the illustrated embodiment, the piping system 28 comprises a substantially circular pathway circumscribing the inner wall 16, such that the fluid is delivered to each nozzle of the plurality of nozzles 22. In the shown embodiment, a single nozzle of the plurality of nozzles 22 proximal to the pump 23 is independently connected to the pump 23, while the remaining nozzles of the plurality of nozzles 22 are disposed along the substantially circular piping system 28. In such embodiments, the independent nozzle requires reduced pressure to operate. Furthermore, in the illustrated embodiment, the plurality of nozzles 22 are elevated from the piping system 28 via an elevation line that perpendicularly redirects the flow of fluid through the piping system 28 to the plurality of nozzles 22. In this manner, the piping system 28 can be consistently primed and maintained at a constant pressure via the pump 23, such that upon increasing the pressure, fluid is dispensed through the elevation line to the plurality of nozzles 22. As such, the consistent priming decreases the response time between actuation of the pump 23 and fluid being dispensed via the plurality of nozzles 22. In the shown embodiment, a feed hose 27 extends from the pump 23 towards the base 13 of the container 12, such that a lower end of the feed hose 27 is disposed within the lower portion of the interior volume 20. In this manner, the pump 23 is consistently supplied with fluid from the interior volume 20, even as the volume of fluid therein decreases, ensuring that the plant watering pot 11 operates for an extended period between refills of the interior volume 20. In some embodiments, an interior surface of the base 13 is sloped towards the lower end of the feed hose 27, such that fluid within the interior volume 20 is fed towards the lower end of the feed hose 27 to maintain operation of the pump 23.

Referring now to FIG. 3, there is shown a close-up view of the door and control panel of an embodiment of the plant watering pot. An inlet 24 is disposed through the upper wall 17, wherein the inlet 24 provides access to the interior volume of the container. In the shown embodiment, a door 30 is hingedly affixed along an edge of the inlet 24, wherein the door 30 is selectively movable between an open position (as shown in FIG. 3), and a closed position (as shown in FIG. 1). When the door 30 is disposed in the closed position, the door 30 overlies the inlet 24, thereby preventing access to the interior volume. In the shown embodiment, the door 30 further comprises and first panel affixed to a second panel at an angle corresponding to the angle between the upper wall 17 and the outer wall of the container, such that the first panel rests along the upper wall 17 and the second panel rests along the outer wall when the door 30 is in the closed position. Furthermore, in the illustrated embodiment, a projection 31 extends from the second panel of the door 30, wherein the protrusion 31 provides the user with a grasping surface for selectively moving the door 30 between the open and closed positions. In the illustrated embodiment, a recess 32 is disposed along each of the upper wall 17 and the outer wall, wherein the recess 32 corresponds to the dimensions of the door 30, such that when the door 30 is disposed in the closed position, an exterior surface of the door 30 rests flush with an exterior surface of each of the upper wall 17 and the outer wall. In this manner, the door 30 does not protrude from the exterior of the container to reduce the form factor of the container. In the shown embodiment, the control panel 25 is disposed adjacent to the inlet 24 along the upper wall 17, wherein the control panel 25 comprises a display and input mechanism to selectively actuate the plurality of nozzles or select a pre-programmed watering schedule. In the shown embodiment, the control panel 25 comprises a touchscreen display.

Referring now to FIG. 4, there is shown a schematic view of an embodiment of the plant watering pot. The plant watering pot 11 comprises a processor 26 operably connected to each of the control panel 25, the pump 23, a wireless transceiver 35, and a water level sensor 29. The processor 26 is contemplated to execute a pre-programmed watering schedule to selectively actuate the pump 23 to dispense water from the plurality of nozzles 22 in communication with the pump 23, such that the plant watering pot 11 consistently provides water to a plant within the receptacle. The water level sensor 29 is disposed within the interior volume of the container, wherein the water level sensor 29 is configured to detect a present level of water within the interior volume and send an alert signal to the processor 26 upon the level of water within the interior volume falling below a designated threshold. Upon receipt of the alert signal, the processor 26 is configured to display a warning on the control panel 25 to alert the user of the need to refill the interior volume. In the illustrated embodiment, the plant watering pot 11 is in wireless communication with a remote device 34 via a wireless transceiver 35, wherein the remote device 34 receives an alert generated by the plant watering pot 11 to be displayed on a display 37 of the remote device 34. In this manner, the user can be remotely notified of a water level warning generated by actuation of the water level sensor 29 as previously described. In some alternate embodiments, the user can further remotely program the watering schedule via the remote device 34, such as via an associated application, ensuring that the user need not utilize the integrated control panel 25 of the plant watering pot 11. Similarly, a user may selectively adjust the water level threshold upon which the alert signal is generated by the water level sensor 29, to best accommodate the user's availability to refill the interior volume.

Figure 5:
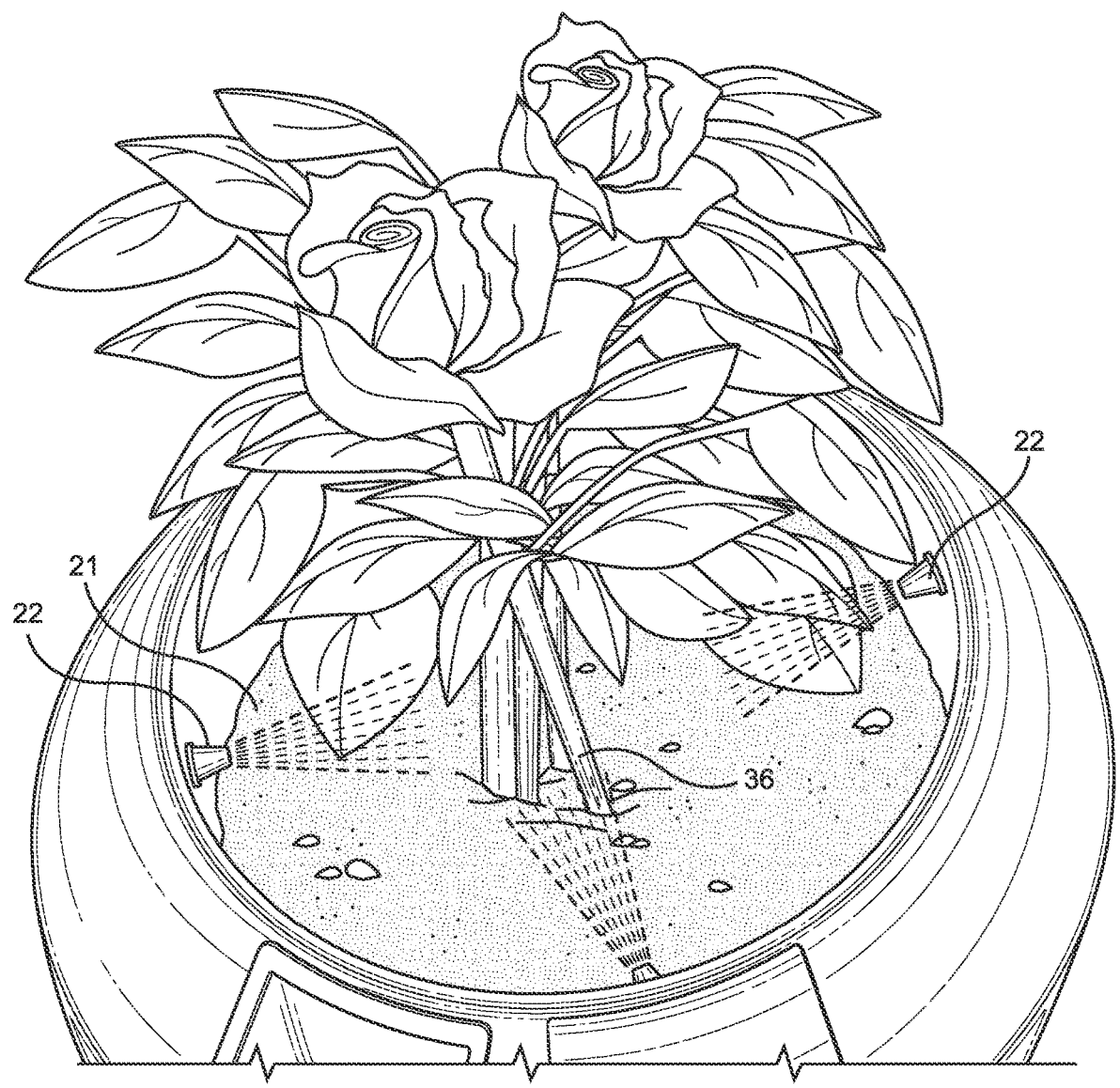
FIG. 5 shows a perspective view of an embodiment of the plant watering pot in use.

Referring now to FIG. 5, there is shown a perspective view of an embodiment of the plant watering pot in use. In one use, a plant 36 is placed within the receptacle 21 of the plant watering pot. A user can then fill the interior volume of the container via the inlet by pivoting the door into the open position. Once full, the user can close the door and select a pre-programmed watering schedule via the control panel, or alternatively, program a new watering schedule via the control panel. An actuation signal generated by the on-board processor in association with the selected watering schedule activates the pump to dispense fluid via each nozzle of the plurality of nozzles 22 for a desired length of time. Should the water level within the interior volume fall below a designated threshold volume, a warning is generated to be displayed on the control panel or a paired remote device. In this manner, the user can ensure that the plant 36 receives consistent and regular watering with minimal input from the user.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant watering pot, comprising:
a container having a base, an outer wall extending from a perimeter of the base, and an inner wall affixed to the outer wall via an upper wall;
wherein the inner wall terminates at a lower end thereof in a platform defining a receptacle in communication with an upper opening of the container;
wherein an interior volume is defined between the inner wall and the outer wall, the interior volume configured to retain a fluid therein;
a plurality of nozzles directly disposed about the inner wall, the plurality of nozzles in fluid communication with the interior volume;
a pump disposed within the interior volume, the pump operably connected to each of the plurality of nozzles, such that when the pump is actuated, fluid within the interior volume is dispensed through at least one of the plurality of nozzles into the receptacle;
an inlet disposed through the upper wall, wherein the inlet provides access to the interior volume;
a control panel disposed on the upper wall, wherein the control panel is operably connected to a processor configured to execute a programmed schedule to selectively actuate the pump for a set duration at a desired time;
an open upper end of the container is disposed at a height greater than that of an upper end of the outer wall, such that the upper wall is disposed at an acute angle relative to the base of the container; and
wherein the plurality of nozzles are operably connected to a pipe extending from the pump, wherein the pipe extends about a circumference of the interior volume.

2. The plant watering pot of claim 1, wherein the plurality of nozzles are disposed equiangularly about the inner wall.

3. The plant watering pot of claim 1, further comprising a feed hose extending from the pump towards the base of the container.

4. The plant watering pot of claim 1, further comprising a water level sensor within the interior volume, wherein the water level sensor is configured to detect and display a current level of fluid disposed within the interior volume.

5. The plant watering pot of claim 4, wherein a warning is generated and displayed on the control panel when the current level of fluid falls below a threshold level.

6. The plant watering pot of claim 1, wherein a door hingedly affixed to the upper wall, wherein the door is selectively movable between an open position and a closed position, wherein the closed position the door overlies the inlet.

7. The plant watering pot of claim 6, wherein the door further comprises a protrusion configured to extend along the outer wall of the container when the door is in the closed position.

8. The plant watering pot of claim 6, wherein the door is disposed within a recess defined within an exterior of the container, such that an exterior surface of the door rests flush with the exterior of the container when the door is in the closed position.

9. A plant watering pot, comprising:
a container having a base, an outer wall extending from a perimeter of the base, and an inner wall affixed to the outer wall via an upper wall;
wherein the inner wall terminates at a lower end thereof in a platform defining a receptacle in communication with an upper opening of the container;
wherein an interior volume is defined between the inner wall and the outer wall, the interior volume configured to retain a fluid therein;
a plurality of nozzles directly disposed about the inner wall, the plurality of nozzles in fluid communication with the interior volume;
a pump disposed within the interior volume, the pump operably connected to each of the plurality of nozzles, such that when the pump is actuated, fluid within the interior volume is dispensed through at least one of the plurality of nozzles into the receptacle;
an inlet disposed through the upper wall, wherein the inlet provides access to the interior volume;
a control panel disposed on the upper wall, wherein the control panel is operably connected to a processor configured to execute a programmed schedule to selectively actuate the pump for a set duration at a desired time;
wherein the control panel is in wireless communication with a remote device, wherein the programmed schedule is adjustable via inputs transmitted from the remote device;
an open upper end of the container is disposed at a height greater than that of an upper end of the outer wall, such that the upper wall is disposed at an acute angle relative to the base of the container; and
wherein the plurality of nozzles are operably connected to a pipe extending from the pump, wherein the pipe extends about a circumference of the interior volume.

10. The plant watering pot of claim 9, wherein the plurality of nozzles are disposed equiangularly about the inner wall.

11. The plant watering pot of claim 9, further comprising a feed hose extending from the pump towards the base of the container.

12. The plant watering pot of claim 9, further comprising a water level sensor within the interior volume, wherein the water level sensor is configured to detect and display a current level of fluid disposed within the interior volume on the control panel and the remote device.

13. The plant watering pot of claim 12, wherein a warning is generated and displayed on the remote device when the current level of fluid falls below a threshold level.

14. The plant watering pot of claim 9, wherein a door hingedly affixed to the upper wall, wherein the door is selectively movable between an open position and a closed position, wherein the closed position the door overlies the inlet.

15. The plant watering pot of claim 14, wherein the door further comprises a protrusion configured to extend along the outer wall of the container when the door is in the closed position.

16. The plant watering pot of claim 14, wherein the door is disposed within a recess defined within an exterior of the container, such that an exterior surface of the door rests flush with the exterior of the container when the door is in the closed position.

* * * * *